US009425468B2

(12) United States Patent
Numao et al.

(10) Patent No.: US 9,425,468 B2
(45) Date of Patent: Aug. 23, 2016

(54) CELL STRUCTURE OF FUEL CELL (71) Applicant: NISSAN MOTOR CO., LTD., Yokohama-shi, Kanagawa (JP)

(72) Inventors: Yasuhiro Numao, Yokohama (JP); Toshikazu Kotaka, Yokohama (JP)

(73) Assignee: NISSAN MOTOR CO., LTD., Yokohama-shi (JP)

(*) Notice: Subject to any disclaimer, the term of this patent is extended or adjusted under 35 U.S.C. 154(b) by 51 days.

(21) Appl. No.: 14/384,306

(22) PCT Filed: Mar. 18, 2013

(86) PCT No.: PCT/JP2013/057604
§ 371 (c)(1),
(2) Date: Sep. 10, 2014

(87) PCT Pub. No.: WO2013/141192
PCT Pub. Date: Sep. 26, 2013

(65) Prior Publication Data
US 2015/0030959 A1    Jan. 29, 2015

(30) Foreign Application Priority Data
Mar. 22, 2012  (JP) ................. 2012-065286

(51) Int. Cl.
*H01M 8/02* (2016.01)
*H01M 8/24* (2016.01)
*H01M 8/10* (2016.01)

(52) U.S. Cl.
CPC .......... *H01M 8/0273* (2013.01); *H01M 8/0232* (2013.01); *H01M 8/0286* (2013.01);
(Continued)

(58) Field of Classification Search
CPC ............ H01M 8/0258; H01M 8/0247; H01M 2008/1095
See application file for complete search history.

(56) References Cited

U.S. PATENT DOCUMENTS

2009/0214917 A1    8/2009 Tanahashi et al.
2010/0038020 A1    2/2010 Hori et al.
(Continued)

FOREIGN PATENT DOCUMENTS

JP    2007-035612 A    2/2007
JP    2008-059847 A    3/2008
(Continued)

OTHER PUBLICATIONS

European Extended Search Report, Feb. 27, 2015, 7 pages.

*Primary Examiner* — Stewart Fraser
*Assistant Examiner* — Olatunji Godo
(74) *Attorney, Agent, or Firm* — Foley & Lardner LLP (57) ABSTRACT A cell structure of a fuel cell, including: a membrane electrode assembly M in which an electrolyte membrane 1 is sandwiched between a pair of electrode layers 2 and 3; a frame 4 disposed around an outer periphery of the electrolyte membrane 1; a separator 5 to define a gas channel G between the separator 5 and the membrane electrode assembly M; a seal member 6 disposed at an outer side of the gas channel G; and a gas-permeable metal porous body 23 disposed on a surface of the electrode layers 2 and 3, wherein the metal porous body 23 includes an extension 23A at an outer rim that extends outward beyond the electrode layers 2, the frame 4 includes an embedding portion 40 where the extension 23A of the metal porous body 23 is embedded, and the cell structure further comprises a holding means to hold the extension 23A of the metal porous body 23 between the separator 5 and the embedding portion 40.

17 Claims, 7 Drawing Sheets (52) U.S. Cl.
CPC ............ H01M8/1004 (2013.01); H01M 8/242 (2013.01); H01M 8/0276 (2013.01); H01M 2008/1095 (2013.01); H01M 2300/0082 (2013.01); Y02E 60/50 (2013.01)

(56) References Cited

U.S. PATENT DOCUMENTS

| | | | |
|---|---|---|---|
| 2010/0291472 | A1 | 11/2010 | Suzuki et al. |
| 2011/0229790 | A1* | 9/2011 | Sato .................... H01M 8/0278 429/469 |
| 2012/0115072 | A1 | 5/2012 | Jeong et al. |
| 2013/0089808 | A1 | 4/2013 | Yoshikawa et al. |

FOREIGN PATENT DOCUMENTS

| | | |
|---|---|---|
| JP | 2008-282821 A | 11/2008 |
| JP | 2009-199867 A | 9/2009 |
| JP | 2009-211927 A | 9/2009 |
| JP | 2011-159458 A | 8/2011 |
| WO | WO 2011/158286 A1 | 12/2011 |
| WO | WO 2013/136816 A1 | 9/2013 |

* cited by examiner

CELL STRUCTURE OF FUEL CELL

TECHNICAL FIELD

The present invention relates to an improvement of a cell structure of fuel cells such as polymer electrolyte fuel cells (PEFCs).

BACKGROUND ART

A cell structure of such fuel cells is disclosed in Patent Document 1, where the product is referred to as a "fuel cell". The fuel cell described in Patent Document 1 includes a membrane electrode assembly in which an electrolyte membrane is sandwiched between an anode catalyst layer and a cathode catalyst layer, a plurality of gas-permeable films arranged such that each side of the membrane electrode assembly has a plurality of the films, a sealing gasket that is formed on the outer rims of the membrane electrode assembly and the gas-permeable layers on both sides by injection molding, and a separator that supports the multilayer structure.

In the above-described fuel cell, the gas-permeable layers include a gas diffusion layer made of a carbon cloth or a carbon paper. For the sake of impregnating the gas diffusion layer with resin, the sealing gasket is formed by injection molding. The sealing gasket serves not only as a sealer but also as a frame for supporting the membrane electrode assembly. In the above-described fuel cell, the outer rims of the gas-permeable layers on one side, the membrane electrode assembly and the gas permeable layers on the other side are sequentially displaced outward. This feature is intended to facilitate the impregnation with resin in the injection molding and to regulate a flow of gas that does not involved in the reaction so as to improve the power generation efficiency.

CITATION LIST

Patent Literature

Patent Document 1: Japanese Patent Unexamined Publication No. 2009-211927

SUMMARY OF INVENTION

Technical Problem

The above-described conventional fuel cell requires a space for a gas channel in the separator that allows reactive gas to flow through it, although it is not clearly described. Further, since the sealing gasket is made of resin, it is required to form a groove on the separator and to fit a seal member in the groove in order to prevent leak of the reactive gas. In the light of durability against pressure difference between the anode side and the cathode side and wet-dry cycle, there was still a room for improvement on the positions of the gas channel space and the groove in the separator relative to the position of the gas diffusion layer.

The present invention was made in view of the above-described problems, and an object thereof is to provide a cell structure of a fuel cell that can have greatly improved durability against pressure difference between the anode side and the cathode side and dry-wet cycle.

Solution to Problem

The cell structure of the fuel cell of the present invention includes a membrane electrode assembly in which an electrolyte membrane is sandwiched between a pair of electrode layers, a frame disposed at an outer periphery of the electrolyte membrane, a separator that defines a gas channel between the separator and the membrane electrode assembly, a seal member disposed at an outer side of the gas channel, a gas-permeable metal porous body disposed on a surface of the electrode layers. The metal porous body includes an extension at the outer rim that extends outward beyond the electrolyte layers. The frame includes an embedding portion where at least a part of the extension of the metal porous body is embedded. The cell structure of the fuel cell further includes a holding means to hold the extension of the metal porous body between the separator and the embedding portion. With the configuration as described above, the problems with the prior art are solved.

Advantageous Effects of Invention

In the cell structure of the fuel cell of the present invention, the frame includes the embedding portion where at least a part of the extension of the metal porous body is embedded, and the holding means to hold the extension of the metal porous body. They prevents bending deformation of the joining portion between the frame and the metal porous body so as to decrease a stress applied on the outer end of the joining portion. As a result, the cell structure of the fuel cell can have greatly improved durability against pressure difference between the anode side and cathode side and wet-dry cycle.

BRIEF DESCRIPTION OF DRAWINGS

FIG. 2 is: (A) a plan view of a frame and a membrane electrode assembly of the single cell of FIG. 1; and (B) a cross sectional view taken along the line A-A of (A).

FIG. 6 is: (A) a plan view illustrating a metal porous body of the single cell of FIG. 5; and (B) a cross sectional view of the metal porous body and the frame before integrally assembled, and (C) a cross sectional view after integrally assembled.

DESCRIPTION OF EMBODIMENTS

First Embodiment

Hereinafter, an embodiment of the cell structure of the fuel cell will be described. A single cell FC of a fuel cell as illustrated in FIGS. 1 and 2 includes a membrane electrode assembly M in which an electrolyte membrane 1 (polymer electrolyte membrane) is sandwiched between a pair of electrode layers, i.e. a cathode layer 2 and an anode layer (not shown), a frame 4 disposed at the outer periphery of the membrane electrode assembly M, and separators 5 which define respective gas channels G between the membrane electrode assembly M and the separators 5.

In this embodiment, the membrane electrode assembly M, which is referred to as an MEA (membrane electrode assembly), includes a gas diffusion layer. That is, as illustrated in FIG. 1, each of the cathode layer 2 and the anode layer of the membrane electrode assembly M includes a catalyst layer 21, a gas diffusion layer 22 and a metal porous body 23 that serves as a gas diffusion layer, which are arranged in this order from the electrolyte membrane 1. Each gas diffusion layer 22 may be composed of a plurality of layers.

Figure 1:
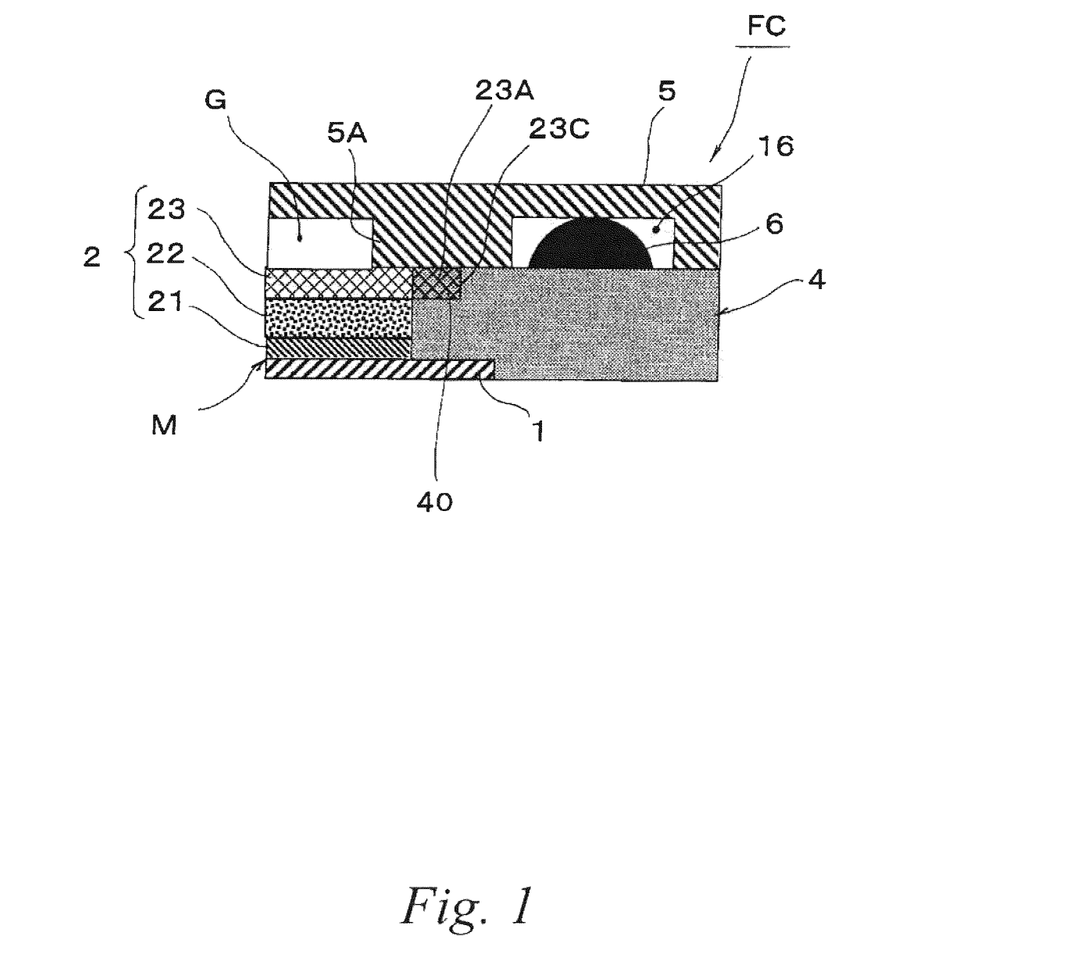
FIG. 1 is a cross sectional view of a single cell illustrating a first embodiment of the cell structure of the fuel cell, where one side is not shown.
Figure 2:
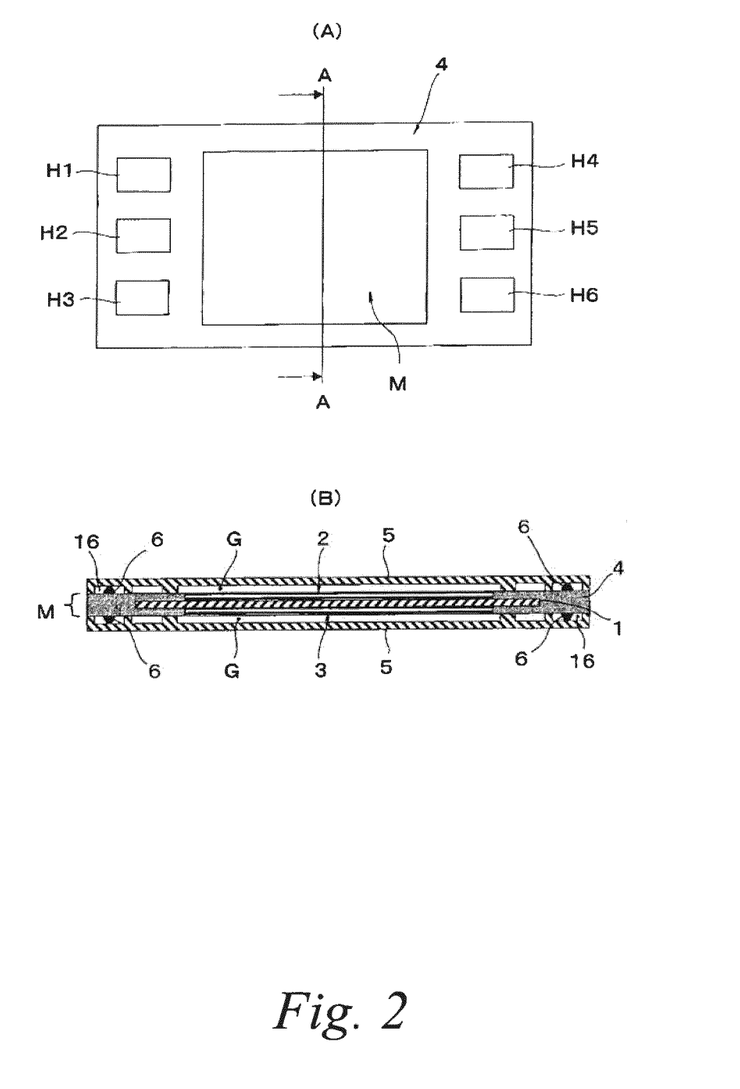

FIG. 1 illustrates only one side of the single cell FC where the cathode layer 2 is provided. As with the reference example illustrated in FIG. 3, the actual single cell FC includes the cathode layer 2 and the anode layer 3 around the electrolyte layer 1 on the center. The layers 2 and 3 respectively includes the catalyst layers 21, 31, the gas diffusion layers 22, 32 and the metal porous bodies 23 and 33, which are respectively arranged in this order from the electrolyte membrane 1. The anode side, which is not shown in FIG. 1, has a symmetrical structure. However, it may have an asymmetrical structure.

The frame 4 is a resin member that supports the membrane electrode assembly M and also serves as a gasket. As illustrated in FIG. 2(A), the frame 4 is formed in a flat rectangular shape integrally with the membrane electrode assembly M around the outer periphery thereof such that the membrane electrode assembly M is exposed at the center of the flat face.

The frame 4 includes supply holes H1 to H3 for cathode gas (oxygen-containing gas), cooling liquid and anode gas (hydrogen-containing gas) along one short side (left side in FIG. 2(A)), and discharge holes H4 to H6 for these fluids along the other short side. The positional relationship between the supply holes and the discharge holes may be suitably changed.

The separator 5 also serves as a current collector. Although it is not shown in the figure, the separator 5 has a flat rectangular shape corresponding to the frame 4 with supply holes and discharge holes similar to those of frame 4. The separator 5 defines the above-described gas channel G when it is assembled with the membrane electrode assembly M. If a plurality of the single cells FC of this embodiment are stuck together, the supply holes (H1 to H3) and the discharge holes (H4 to H6) are respectively connected to each other in the direction of the stack to form respective channels. Further, a gap between adjacent single cells FC (a gap between separators 5) allows cooling liquid to flow through it.

Between the separator 5 and the frame 4, a seal member 6 as illustrated in FIG. 1 is provided. That is, the separator 5 has a groove 16 at the peripheral side of the gas channel G, and the seal member 6 is disposed in the groove 16. The seal member 6 is provided surrounding the periphery of the frame 4 and surrounding the supply holes H1 to H3 and the discharge holes H4 to H6, in which an opening is provided around each of the holes H1 to H6 so that gas can flow to the corresponding layers.

In the cathode layer 2 or the anode layer, a gas diffusion layer 22 is made of for example, a carbon material. More desirably, it may be made of a sheet carbon material.

The metal porous body 23, which is disposed on the surface of the electrode layer (cathode layer 2 or anode layer), is permeable to gas and also functions as a gas diffusion layer as described above. The metal porous body 23 is desirably made of at least one metal selected from iron, stainless steel, aluminum and aluminum alloys, titanium and titanium alloys, chromium and chromium alloys, nickel and nickel alloys and magnesium and magnesium alloys. Specifically, the metal porous body 23 is made of a punching metal, an etching metal, a metal mesh, an expanded metal or the like.

In the single cell FC, the metal porous body 23 has an extension 23A at the outer rim that extends outward beyond the electrode layer, i.e. the major portion of the cathode layer 2 or the anode layer as illustrated in FIG. 1. Further, in the single cell FC, the frame 4 includes an embedding portion 40 where at least a part of the extension 23A of the metal porous body 23 is embedded. The surfaces of the metal porous body 23 and the frame 4 are flush with each other. However, the surfaces of the metal porous body 23 and the frame 4 are not necessarily flush with each other, and there may be a step between them.

That is, in the single cell FC, since the frame 4 is made of resin as described above, the embedding portion 40 is formed by insertion of the extension 23A of the metal porous body 23 during the injection molding of the frame 4 or by thermocompression bonding of the extension 23A to the previously molded frame 4. By a method suitably selected from them, the frame 4 and the metal porous body 23 are integrated with each other.

Further, the single cell FC includes a holding means to hold the extension 23A of the metal porous body 23 between the separator 4 and the embedding portion 40. The holding means restrains a displacement of the extension 23A of the metal porous body 23 in the thickness direction (the length direction in FIG. 1), or restrains a displacement of the extension 23A of the metal porous body 23 in the in-plane direction (the width direction in FIG. 1).

The holding means of this embodiment is a protrusion 5A that is formed on the inner face of the separator 5. The protrusion 5A faces the embedding portion 40 of the extension 23A and the surrounding part thereof so as to restrain a displacement of the extension 23A of the metal porous body 23 in the thickness direction. The protrusion 5A secures a certain thickness of a gas channel G on the cathode layer 2 or the anode layer, and is disposed at a suitable position according to the flow direction of the gas. In the single cell FC of this embodiment, one of some protrusions is utilized as the protrusion 5A of the holding means.

With the above-described configuration, the single cell FC of the fuel cell can reduce a stress that is applied on the outer end 23C of the joining portion between the metal porous body 23 and the frame 4. That is, single cells FC of this kind inevitably produce a pressure difference between the anode side and the cathode side, and also repeat swelling and drying of the membrane electrode assembly M. Therefore, the membrane electrode assembly M is subjected to loads due to the pressure difference and the dry-wet cycle, which generates stresses at the joining portion to the frame 4.

To cope with these stresses, the single cell FC is fabricated such that the extension 23A of the metal porous body 23 is embedded in the frame 4 to form the embedding portion 40 that integrates the frame 4 with the metal porous body 23, so that the frame 4 is reinforced by the metal porous body 23.

Further, in the single cell FC, the protrusion (holding means) 5A of the separator 5 presses the joining portion between the membrane electrode assembly M and the frame 4, i.e. the embedding portion 40 of the extension 23A in the frame 4, so as to restrain a displacement in the thickness direction. This suppresses bending deformation of the joining portion, and thereby reduces a stress applied on the outer end 23C of the joining portion. In this way, the single cell FC can greatly increase the durability against the pressure difference between the anode side and the cathode side and the dry-wet cycle.

In the single cell FC, since the frame 4 is reinforced by the metal porous body 23 such that the frame 4 is integrated with the metal porous body 23 via the embedding portion 40, the frame 4 can maintain the function of supporting the membrane electrode assembly M at a good level even if the frame 4 is made thinner. Furthermore, the thinner frame 4 enables the thinner gas diffusion layer 22 disposed under the metal porous body 23.

Furthermore, in the single cell FC, the method of producing the frame 4 and the means to integrate the frame 4 with the metal porous body 23 are selectable. That is, since it is substantially impossible to join the gas diffusion layer of a carbon material to the resin frame by thermocompression bonding, there is no option but to form the frame 4 by injection molding in order to join them to each other. However, since the single cell FC includes the embedded portion 40 that are formed by embedding at least a part of the extension 23A of the metal porous body 23 in the frame 4, it becomes possible to use resin molding methods such as injection molding and joining means such as thermocompression bonding. As a result, this allows greater flexibility of the producing method of the frame 4 and the means to integrate the frame 4 with the metal porous body 23.

Furthermore, in the single cell FC, a certain level of advantageous effect is obtained at least by embedding the extension 23A of the metal porous body 23 in the frame 4 to form the embedding portion 40. Accordingly, it is not required to join the catalyst layer 21 and the gas diffusion layer 22 to the frame 4. Even in this case, the gas sealing between the membrane electrode assembly M and the frame 4 can be maintained at high level due to the integrated structure of the frame 4 and the extension 23A (the embedding portion 40).

As described above, in the single cell FC, the frame 4 can maintain the function of supporting the membrane electrode assembly M at high level by the reinforcement of the frame 4 with the metal porous body 23, which enables improvement in durability and productivity while reducing the thickness of the single cell.

Further, a plurality of the above-described single cells form a fuel cell stack by being stuck together. Due to the thinner single cells, the fuel cell stack can be reduced in whole size and weight and can be produced at low cost. Therefore, it is very suitable for on-board power sources of automobiles and the like, Reference Example A single cell FC of a fuel cell of FIG. 3 has the same basic configuration as the first embodiment, and includes a membrane electrode assembly M in which an electrolyte membrane (polymer electrolyte membrane) 1 is sandwiched between a pair of electrode layers, i.e. a cathode layer 2 and an anode layer 3, a frame 4 disposed around the outer periphery of the membrane electrode assembly M, and separators 5, 5 that define gas channels G, G between the separators 5, 5 and the membrane electrode assembly M.

As illustrated in FIG. 1, the cathode layer 2 and the anode layer 3 of the membrane electrode assembly M respectively include catalyst layers 21, 31, gas diffusion layers 22, 32, and metal porous bodies 23, 33 that serve as gas diffusion layers, which are respectively arranged in this order from the electrolyte layer 1. Between the separators and the frame 4, seal members 6 are interposed.

Figure 3:
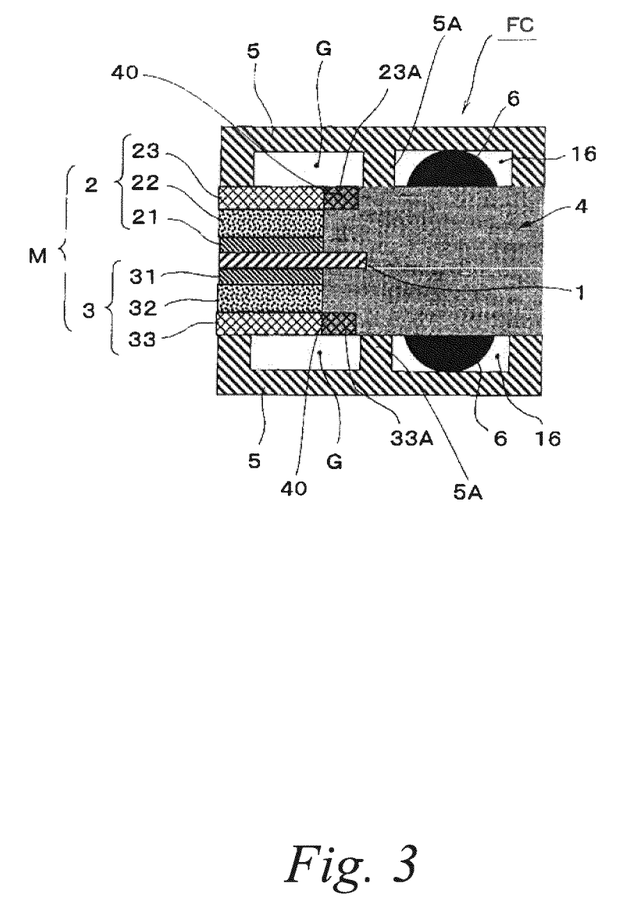
FIG. 3 is a cross sectional view illustrating a reference example of a single cell.

The metal porous bodies 23 and 33 include extensions 23A, 33A at the outer rim, which extend outward beyond the electrode layers. The frame 4 includes embedding portions 40 in which at least a part of the extensions 23A, 33A of the metal porous bodies 23, 33 are embedded.

Further, this single cell FC includes protrusions 5A on the inner faces of the separators 5. However, the protrusions 5A of this reference example are in contact with only the frame 4, and do not serve as holding means as described in the first embodiment, i.e. do not have a function of directly holding the extensions 23A and 33A.

In this single cell FC with the above-described configuration, since the extensions 23A, 33A of the metal porous bodies 23, 33 are embedded in the frame 4 to form the embedding portions 40 that integrate them together, the frame 4 is reinforced by the metal porous bodies 23, 33. As a result, in the single cell FC, the frame 4 can maintain the function of supporting the membrane electrode assembly M at high level even if the frame 4 is made thinner.

Figure 4:
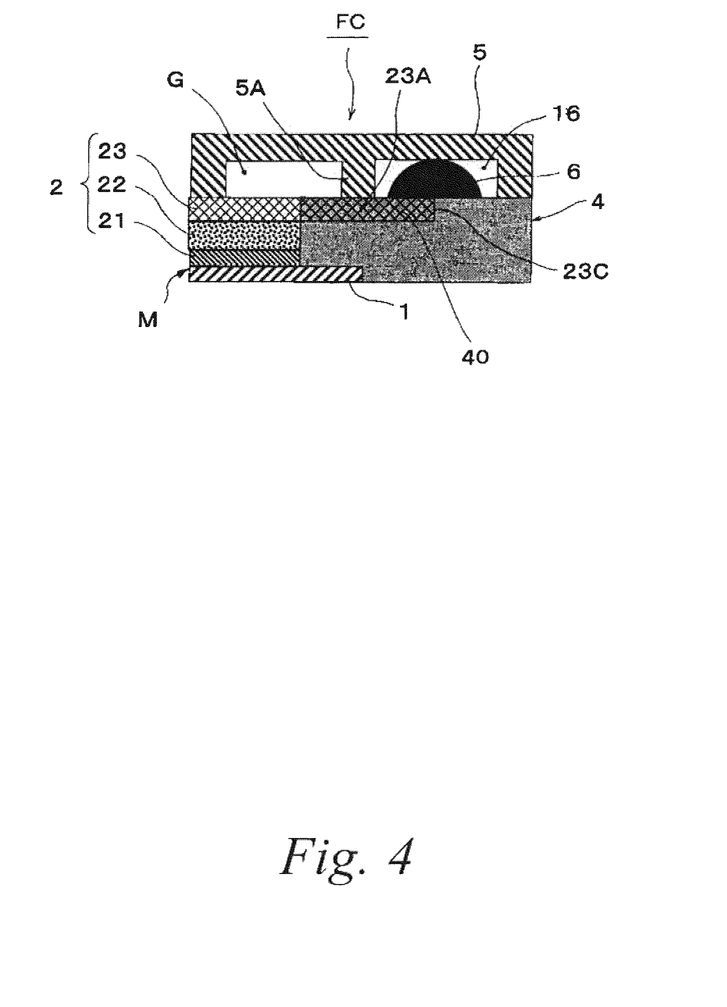
FIG. 4 is a cross sectional view of a single cell illustrating a second embodiment of the cell structure of the fuel cell, where one side is not shown.
Figure 5:
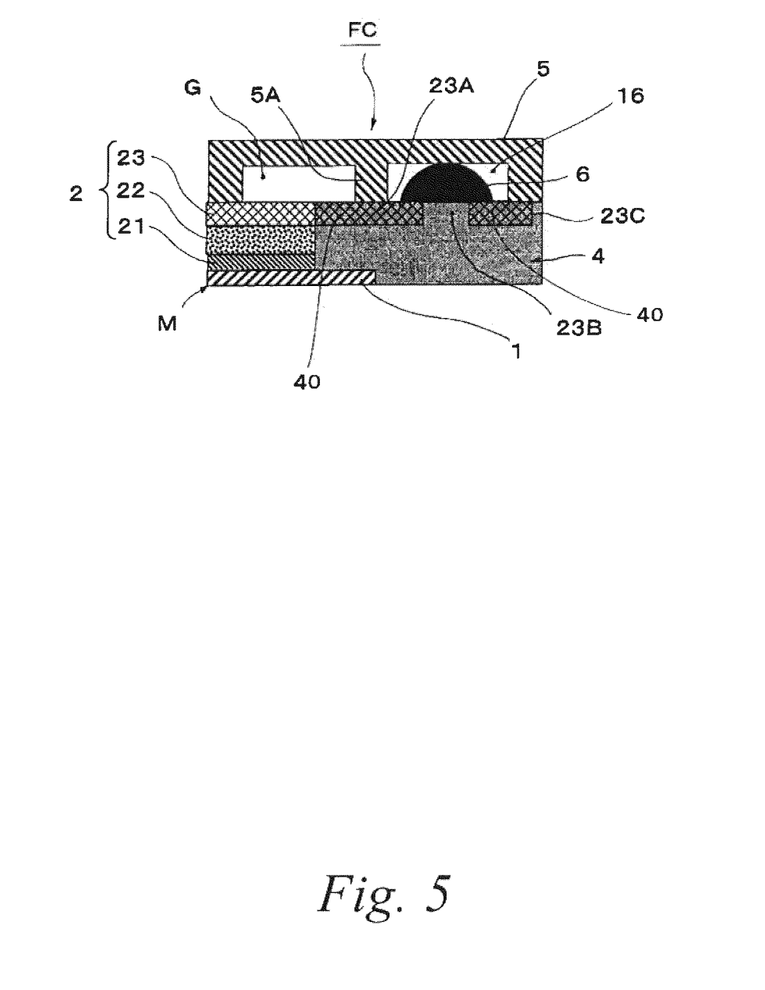
FIG. 5 is a cross sectional view of a single cell illustrating a third embodiment of the cell structure of the fuel cell, where one side is not shown.
Figure 6:
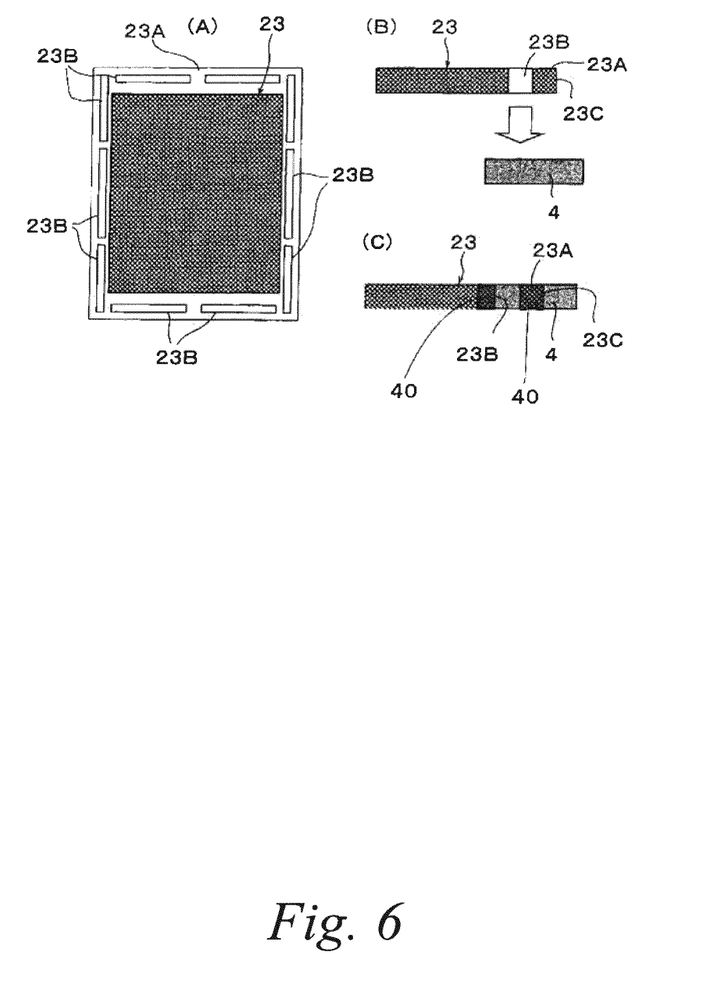

FIGS. 4 to 6 are views illustrating second and third embodiments of the cell structure of the fuel cell according to the present invention. In the following embodiments, the same components as those of the previously-described embodiment are referred by the same reference numbers, and the descriptions thereof are omitted.

Second Embodiment

A single cell FC illustrated in FIG. 4 has a basic configuration similar to the previously-described embodiment. An extension 23A of a metal. porous body 23 is further enlarged outward, and a frame 4 includes an embedding portion 40 where at least a part of the extension 23A is embedded. Furthermore, the single cell FC illustrated in the figure includes holding means to hold the extension 23A of the metal porous body 23 between a separator 5 and the embedding portion 40.

The holding means of this embodiment restrains a displacement of the extension 23A of the metal porous body 23 in the thickness direction, and also restrain a displacement of the extension of the metal porous body in the in-plane direction. Specifically, the holding means is a protrusion 5A of the separator 5, which presses the extension 23A to restrain a displacement in the thickness direction. Further, the holding means includes a seal member 6 disposed in a groove 16 of the separator 5. The seal member 6, which serves as a supplemental holding means, is in contact with the extension 23A to restrain a displacement of the extension 23A in the thickness direction. Further, since the seal member 6 is adhesive, it also restrains a displacement of the extension 23A in the in-plane direction. FIG. 4 shows only one side where the cathode layer 2 is provided. As with FIG. 1, the omitted anode side has a symmetrical configuration.

In this single cell FC, the porosity of the extension 23A is higher than that of the other part of the metal porous body 23 as illustrated in FIG. 6(A). The other part refers to the part that is laminated on the membrane electrode assembly M. That is, the metal porous body 23 illustrated in the figure has a plurality of slits 23B in the extension 23A, i.e. along the outer rim, which are disposed almost over the entire circumference. These slits 23B increase the porosity of the extension 23A. Instead of slits, holes having a suitable shape may be formed. Alternatively, the porosity of the extension 23A may be equal to that of the other part of the porous body 23.

In this single cell FC, the embedding portion 40 is formed by embedding the extension 23A of the metal porous body 23 in the resin frame 4 as illustrated in FIGS. 6(B) and 6(C). In this process, the high porosity of the extension 23A facilitates impregnation with resin, i.e. the material of the frame 4, and also increases the amount of resin impregnated. That is, the large porosity provides better adhesion with the resin.

In this single cell FC, in addition to advantageous effects similar to those of the previously-described embodiment, the improvement in ease of impregnation with the resin and the amount of resin impregnated makes it easier to control the amount (flow amount) of resin that runs out to the other part of the metal porous body 23 beyond the extension 23A, which enables improvement of the dimension accuracy.

Further, in this single cell FC, if the slits 23B of the extension 23A are located under the seal member 6 as illustrated in FIG. 5, this resin-rich part under the seal member can form a smooth interface with the sealing member 6, which enables further improvement of the sealing. In this embodiment, the holding means on the separator 5 is the protrusion 5A that is formed on the separator 5 and the seal member 6 that is disposed in a groove 16 of the separator 5. However, it should be understood that a different member may be employed as the holding means.

Figure 7:
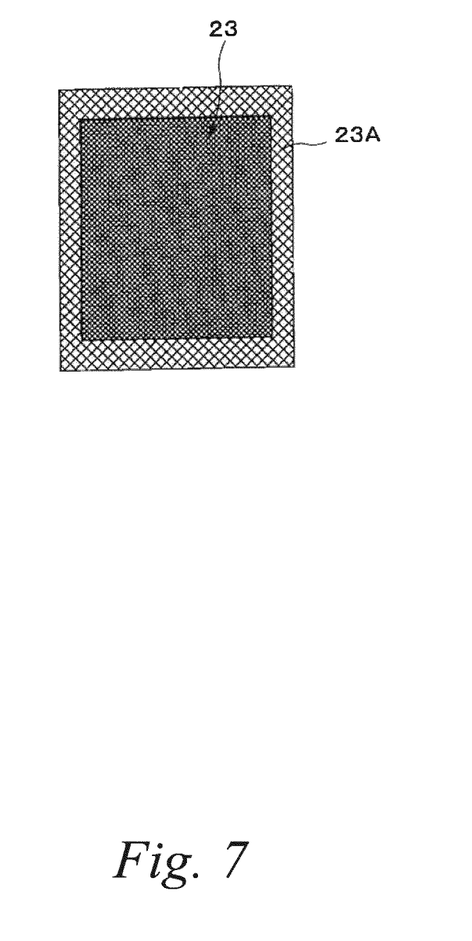
FIG. 7 is a plan view illustrating another example of the metal porous body of the single cell.

FIG. 7 is a view illustrating another example of the metal porous body. The metal porous body 23 of the figure is made of a mesh in which the porosity of an extension 23A is greater than the porosity of the other part, i.e. the center part that is laminated on the membrane electrode assembly M. That is, the metal porous body 23 is composed of the center part of a fine mesh with dense pores (screen) and the extension 23A of a coarse mesh with sparse pores (screen). A single cell FC with this metal porous body 23 has advantageous effects similar to those of the previously-described embodiments.

The cell structure of the fuel cell of the present invention is not limited to the above-described embodiments, and details of the configuration may be suitably changed without departing from the gist of the present invention, including the shape of the whole fuel cell, the material and shape of each component and the like.

REFERENCE SIGNS LIST

FC single cell
G gas channel
M membrane electrode assembly
1 electrolyte membrane
2 cathode layer (electrode layer)
3 anode layer (electrode layer)
4 frame
5 separator
5A protrusion (holding means)
6 seal member (holding means)
23 metal porous body
23A extension
33 metal porous body
33A extension
40 embedding portion

The invention claimed is:

1. A cell structure of a fuel cell, comprising:
a membrane electrode assembly in which an electrolyte membrane is sandwiched between a pair of electrode layers;
a frame disposed around an outer periphery of the membrane electrode assembly;
a separator;
a gas-permeable metal porous body disposed on a surface of each of the electrode layers;
a gas channel having a boundary determined by the separator and the gas-permeable metal porous body; and
a seal member disposed at an outer side of the gas channel,
wherein the gas-permeable metal porous body includes an extension at an outer rim that extends outward beyond the electrode layers,
the frame includes an embedding portion where at least a part of the extension of the gas-permeable metal porous body is embedded, and
the cell structure further comprises a holding means for holding the extension of the gas-permeable metal porous body between the separator and the embedding portion.

2. The cell structure of the fuel cell according to claim 1, wherein the holding means restrains a displacement of the extension of the gas-permeable metal porous body in a thickness direction.

3. The cell structure of the fuel cell according to claim 1, wherein the holding means restrains a displacement of the extension of the gas-permeable metal porous body in an in-plane direction.

4. The cell structure of the fuel cell according to claim 1, wherein the holding means is a protrusion of an inner face of the separator.

5. The cell structure according to claim 1, wherein the seal member is in contact with the separator and the frame.

6. The cell structure of the fuel cell according to claim 5, wherein the seal member is also in contact with at least a portion of the part of the extension of the gas-permeable metal porous body that is embedded in the embedding portion.

7. The cell structure according to claim 1, wherein a porosity of the extension of the gas-permeable metal porous body is greater than a porosity of another part of the gas-permeable metal porous body.

8. A fuel cell stack, comprising a plurality of fuel cells having the cell structure according to claim 1, the fuel cells being connected together.

9. The cell structure according to claim 1, wherein each of the electrode layers includes a catalyst layer.

10. A cell structure of a fuel cell, comprising:
a membrane electrode assembly in which an electrolyte membrane is sandwiched between a pair of electrode layers;
a frame disposed around an outer periphery of the membrane electrode assembly;
a separator;
a gas-permeable metal porous body disposed on a surface of each of the electrode layers;
a gas channel having a boundary determined by the separator and the gas-permeable metal porous body; and
a seal member disposed at an outer side of the gas channel,
wherein the gas-permeable metal porous body includes an extension at an outer rim that extends outward beyond the electrode layers,
the frame includes an embedding portion where at least a part of the extension of the gas-permeable metal porous body is embedded, and
the separator holds the extension of the gas-permeable metal porous body between the separator and the embedding portion.

11. The cell structure of the fuel cell according to claim 10, wherein the separator restrains a displacement of the extension of the gas-permeable metal porous body in a thickness direction.

12. The cell structure of the fuel cell according to claim 10, wherein the separator restrains a displacement of the extension of the gas-permeable metal porous body in an in-plane direction.

13. The cell structure according to claim 10, wherein a porosity of the extension of the gas-permeable metal porous body is greater than a porosity of another part of the gas-permeable metal porous body.

14. The cell structure according to claim 10, wherein each of the electrode layers includes a catalyst layer.

15. The cell structure according to claim 10, wherein the seal member is in contact with the separator and the frame.

16. The cell structure of the fuel cell according to claim 15, wherein the seal member is also in contact with at least a portion of the part of the extension of the gas-permeable metal porous body that is embedded in the embedding portion.

17. A fuel cell stack, comprising a plurality of fuel cells having the cell structure according to claim 10, the fuel cells being connected together.

* * * * *